United States Patent [19]
Droulon

[11] Patent Number: 5,183,236
[45] Date of Patent: Feb. 2, 1993

[54] LOCKING DEVICE FOR RECTILINEAR OR CIRCULAR DISPLACEMENT MECHANICAL JACKS

[75] Inventor: Georges Droulon, Flers, France

[73] Assignee: ETS. Cousin Freres, Flers, France

[21] Appl. No.: 586,433

[22] Filed: Sep. 21, 1990

[30] Foreign Application Priority Data

Sep. 21, 1989 [FR] France ............................. 89 12406

[51] Int. Cl.$^5$ ............................................. B66F 3/02
[52] U.S. Cl. ............................................. 254/95
[58] Field of Search ............................. 254/95–97, 254/1; 297/361, 366; 74/29, 30

[56] References Cited

U.S. PATENT DOCUMENTS 3,456,919 7/1969 Snow .................................. 254/95

FOREIGN PATENT DOCUMENTS 2574721 12/1984 France .
2592441 12/1985 France .

*Primary Examiner*—Robert C. Watson
*Attorney, Agent, or Firm*—Robert W. Becker & Associates

[57] ABSTRACT

The device comprises at least one rod normally locked by notched rollers mounted on pins and cooperating with at least one V-shaped bearing plate having toothed ramps, and the vertical displacement of which is made by rotation of a cam driven by a set of studs rigid with a circular member, with control means being further provided to drive this circular member.

11 Claims, 9 Drawing Sheets

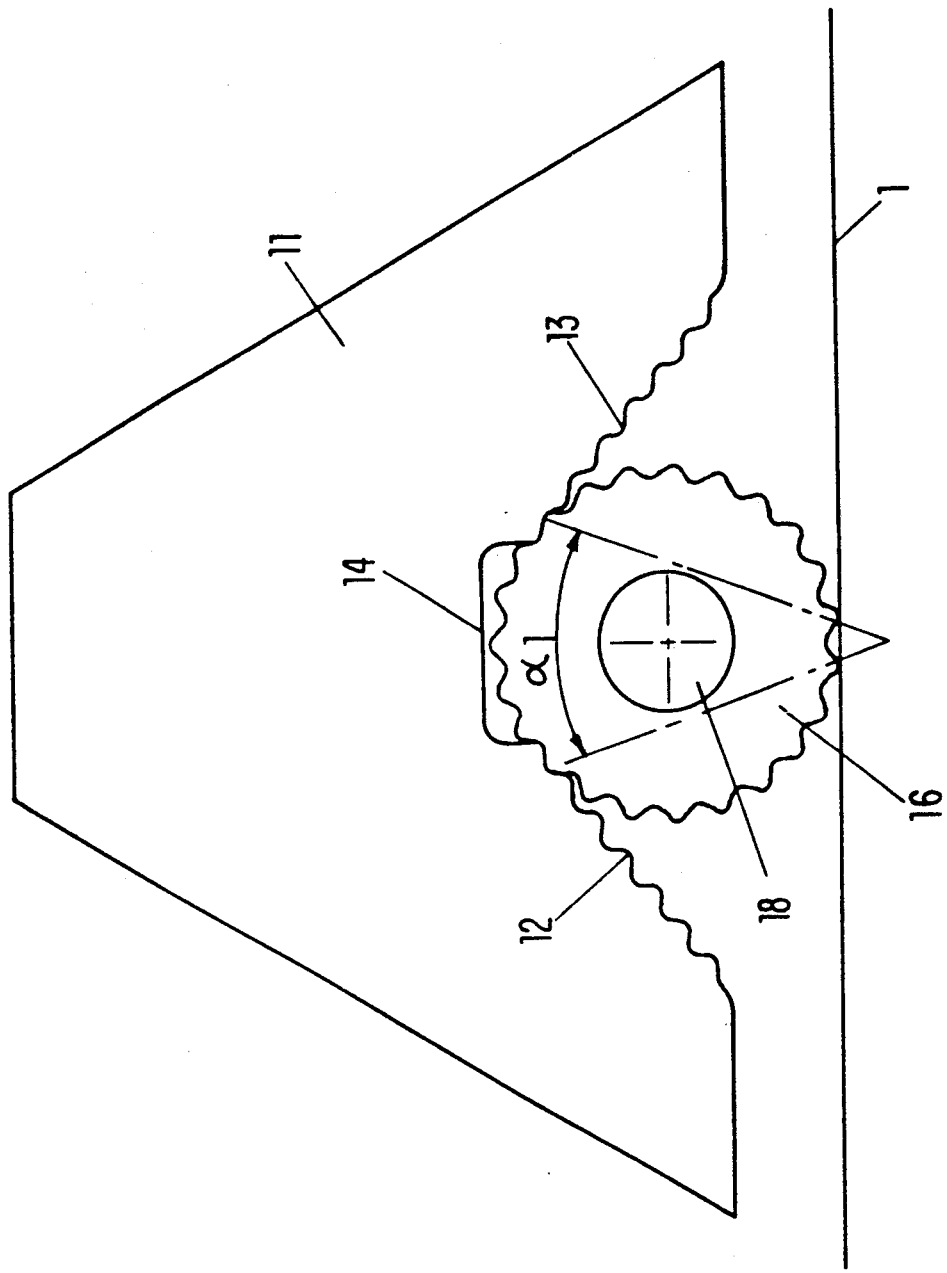

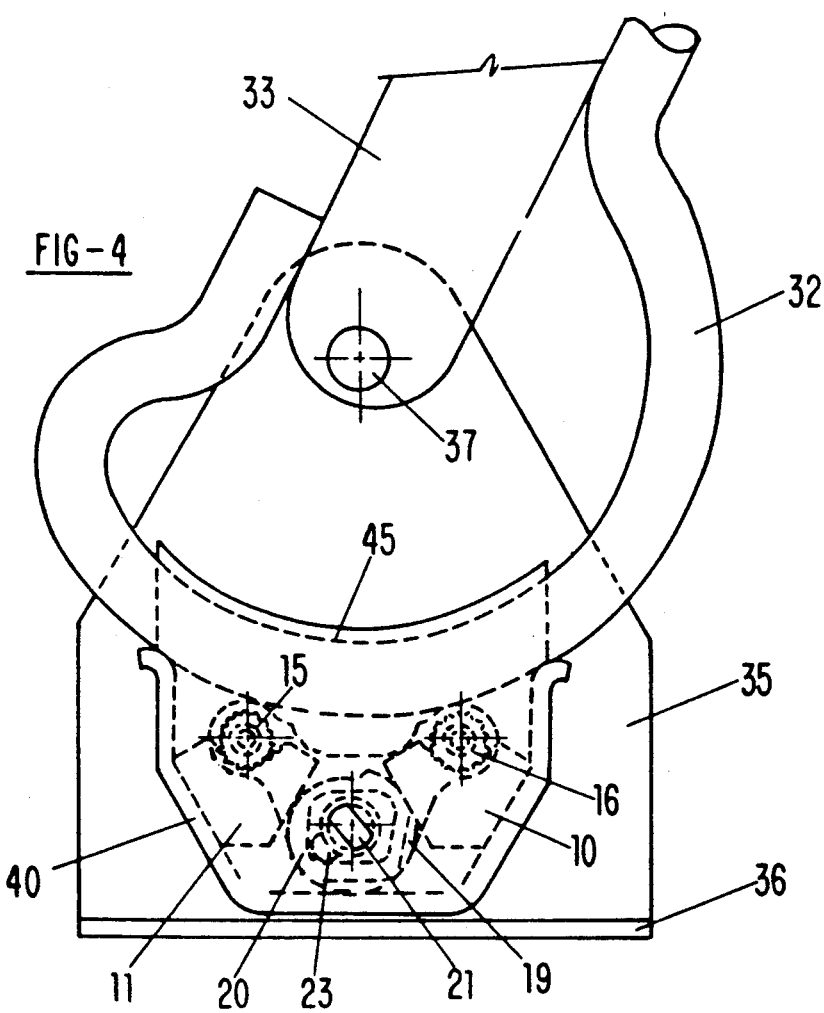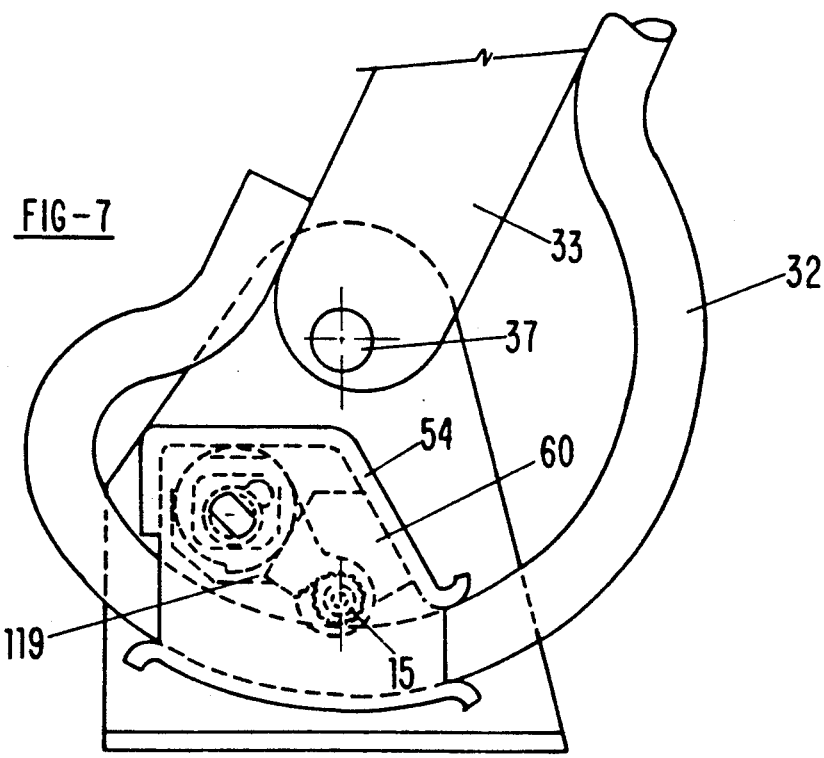

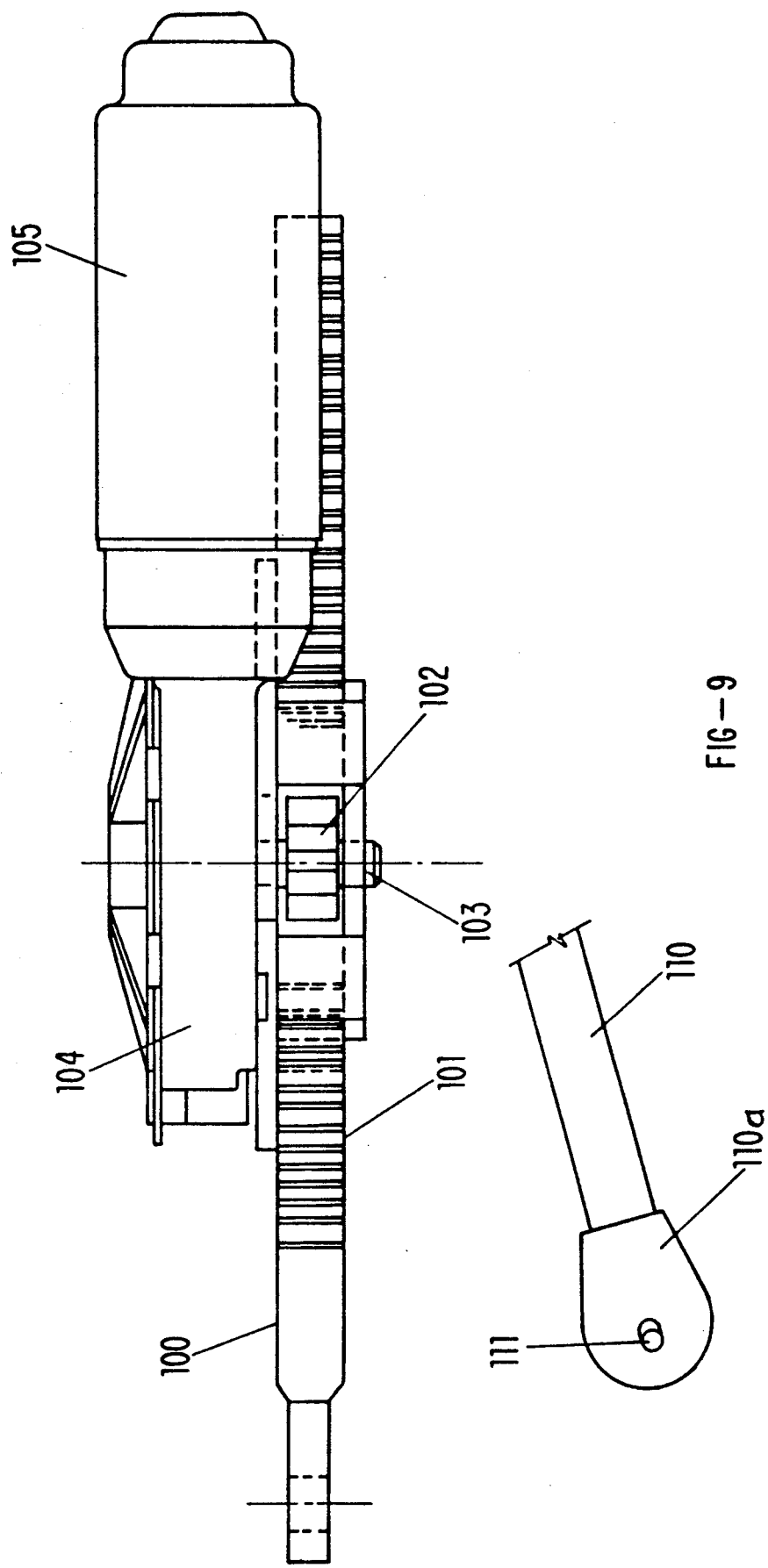

ial displacement which is created by rotation of a control cam controlled by one of a manual and motorized element, the control cam having studs rigidly connected thereto, and holding in position of the control cam being provided for a correct locking of the at least one rod under action of a spring placed on the studs, a positive return of the notched rollers and of the bearing plates being provided by two members in a shape of a two-pointed hat controlled by snugs connected to side faces of the cam.
LOCKING DEVICE FOR RECTILINEAR OR CIRCULAR DISPLACEMENT MECHANICAL JACKS

TECHNICAL FIELD

This invention relates to a locking device for rectilinear or circular displacement jacks.

Jacks which are locked by rollers in an indifferent condition are already known, since these jacks are increasingly used in the automobile industry as well as for the setting of the seats of nautical and air vehicles.

However, the various solutions have not proved satisfactory because the lockage safety is insufficient.

BACKGROUND ART

Prior documents which can be mentioned are French Patent specifications No. 2,592,441 and No. 2,574,721.

But in both documents, smooth rollers are used for displacement and locking of the jacks, making it necessary to provide an extra safety device which is therefore costly and not completely safe.

DISCLOSURE OF THE INVENTION

The present invention remedies these disadvantages by providing a locking device for rectilinear or circular displacement mechanical jacks, the study of which has been more particularly addressed to providing a rectilinear and continuous displacement of the seating portion and a circular and continuous offset of the backing portion of vehicle seats, the movements of which can be obtained either manually or by an appropriate motorized system.

These embodiments are very simple and, at the same time, very safe since locking of the jack is perfect and resists transverse as well as frontal impacts. Also, the seats provided with these locking devices are not only very easily adjustable by the user but ensure a great safety since, should an accident occur, they absorb a considerable energy by being deformed, thereby protecting the passengers sitting on the seat, without any risk of an inadvertent unlatching.

According to the invention, the locking device for rectilinear or circular displacement jacks includes at least one rod normally locked by notched rollers mounted in notched V-shaped bearing plates having a vertical displacement which is created by rotation of a control cam controlled by one of a manual and motorized element, the control cam having studs rigidly connected thereto, and holding in position of the control cam being provided for a correct locking of the at least one rod under action of a spring placed on the studs, a positive return of the notched rollers and of the bearing plates being provided by two members in a shape of a two-pointed hat controlled by snugs connected to side faces of the cam.

According to another feature of the invention, the bearing plates are placed so as to provide an unlocking movement either in the upward direction or in the downward direction while being guided by an inner casing having a general shape of a trapezium and used as a support for the jack rod by a lower portion.

Various other features of the invention will become more apparent from the following detailed description.

BRIEF DESCRIPTION OF THE DRAWINGS

Embodiments of the invention are shown by way of non limiting examples in the accompanying drawings, wherein:

FIG. 1c is an enlarged elevation view of the locking members shown in FIGS. 1, 1a and 1b;

FIG. 4 is a side elevation view of an alternative embodiment of FIG. 2;

FIG. 7 is an alternative embodiment of the device of FIG. 6;

FIG. 9 is a plan view corresponding to FIG. 8.

DETAILED DESCRIPTION OF THE INVENTION

Figure 1:
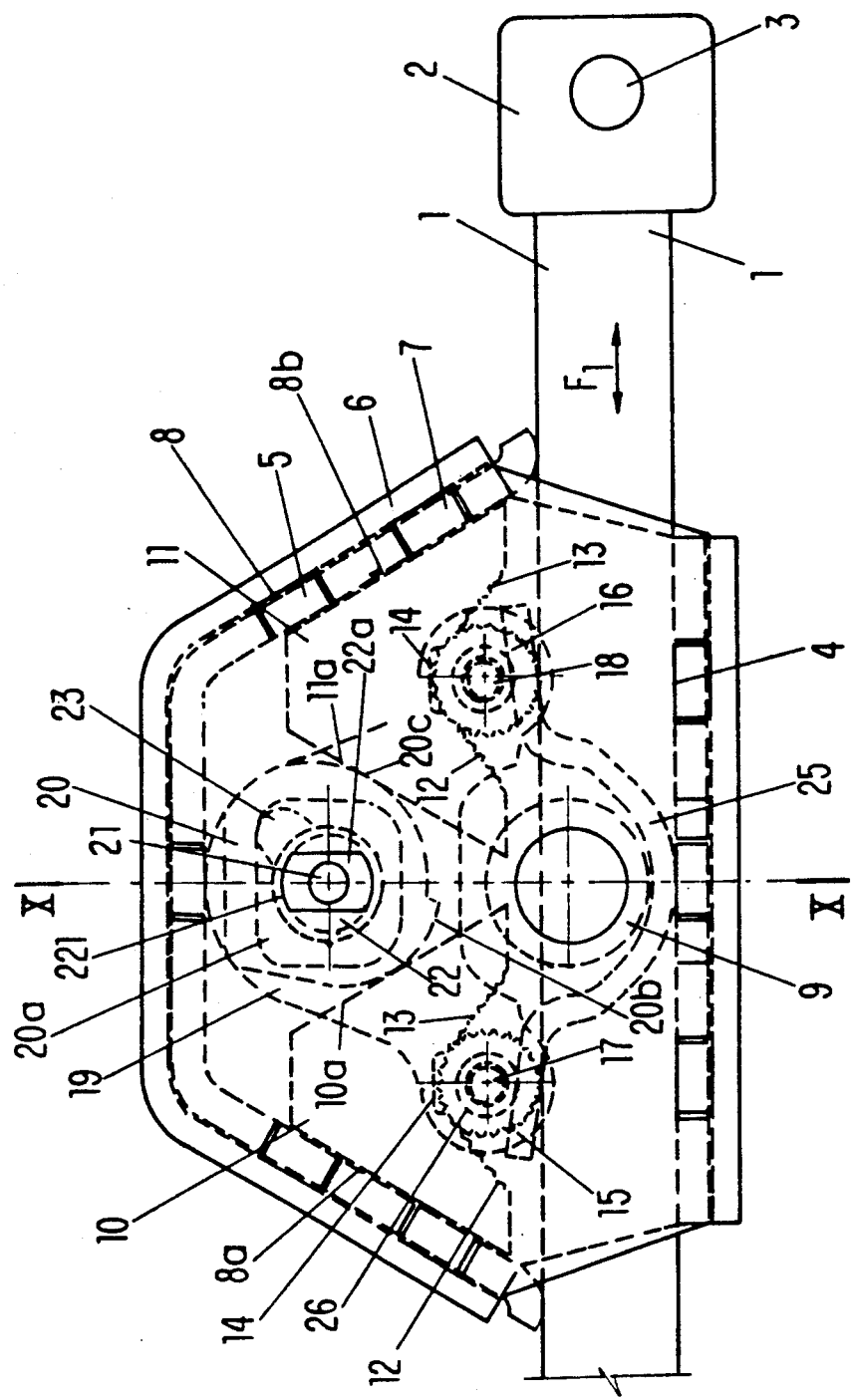
FIG. 1 is a side elevation view of a first embodiment of the locking device for rectilinear displacement mechanical jacks provided with roller return springs.

Referring now to the drawings, FIG. 1 shows schematically the rod 1 of a jack which is rectilinear and the section of which is most often square.

The jack rod 1 carries, at its end 1a, a jack attachment system 2 made of a head through which extends a hole 3 for fixation of the rod 1 on a member rigidly connected for example to the mobile profile of a slide or on a rotation pin of a lever arm rigidly connected to a pivot of a seat back.

The jack rod 1 bears on a bottom 4 of an inner casing 5 having in elevation a shape of a trapezium, which casing 5 is covered by a lid casing 6 which is fixed to the inner casing 5 by turned over lugs 7 extending into pockets 8 formed in the inner casing 5.

A circular part 9 is provided on both sides of the casing 5, 6, which circular part 9 (see FIGS. 1 and 1a) has for its function a fixation of the casings 5, 6 either to the armature of a seat or to a point of another adjusting mechanism by forming the second fixation point of the rectilinear stroke jack for the embodiment of FIGS. 1, 1a, 1b, 1c.

These circular members 9 are placed in the vertical median axis X—X of the casings 5, 6. Slanting sides 8a, 8b of the casing 5 are used as guiding paths for two bearing plates 10, 11 in a shape of a cocked hat with a larger base which is machined in order to form each time two toothed ramps 12, 13 spaced apart by a recess 14. The ramps 12, 13 are each formed with a toothing adapted for cooperating with the notched rollers 15, 16 mounted on pins 17, 18 extending beyond the side faces of the rollers 15, 16. The pins 17, 18 are mounted in two members 19 having a shape of a two-pointed hat.

A cam 20 is placed between the two bearing plates 10, 11, and the movement of the cam 20 is controlled by a shaft 21. The assembly formed by the rollers 15, 16, bearing plates 10, 11, two-pointed hat-shaped member 19 and cam 20 is held within the casings 5, 6. Moreover, the shaft 21 carries a stud 22a, and the shaft 21 can be controlled in rotation either by a lever or by any other desired rotation means. Two protrusions 23 integral with the shaft 21 are placed in the central recess 20a of the member 19 which is in the shape of a two-pointed hat; the cam 20 being centered by means of bores formed in the casing 5, lid 6 and pin 21.

Figure 1A:
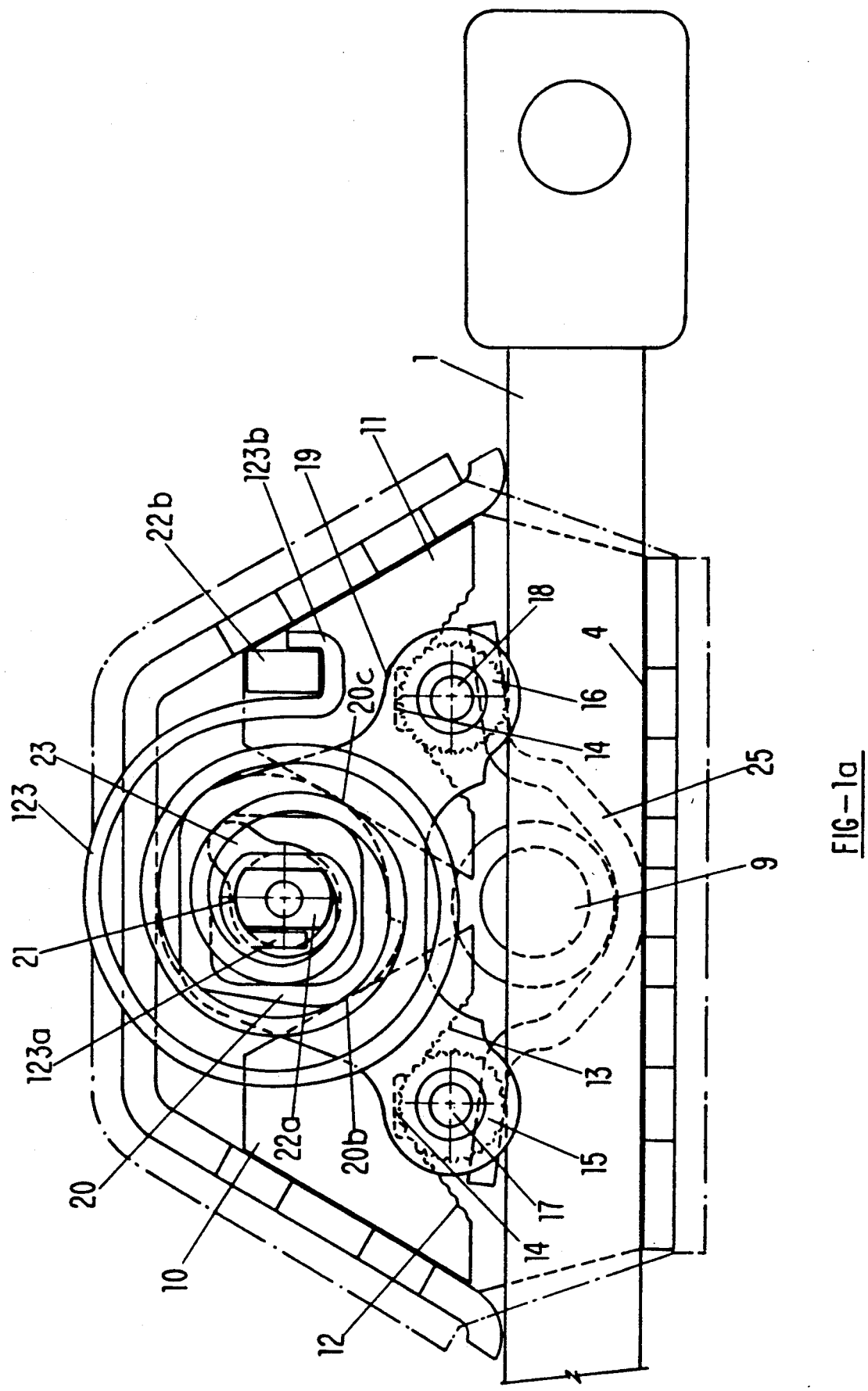
FIG. 1a is an enlarged view corresponding to FIG. 1 and showing the position of various members of the locking device as well as the return coil spring of the control cam.
Figure 1B:
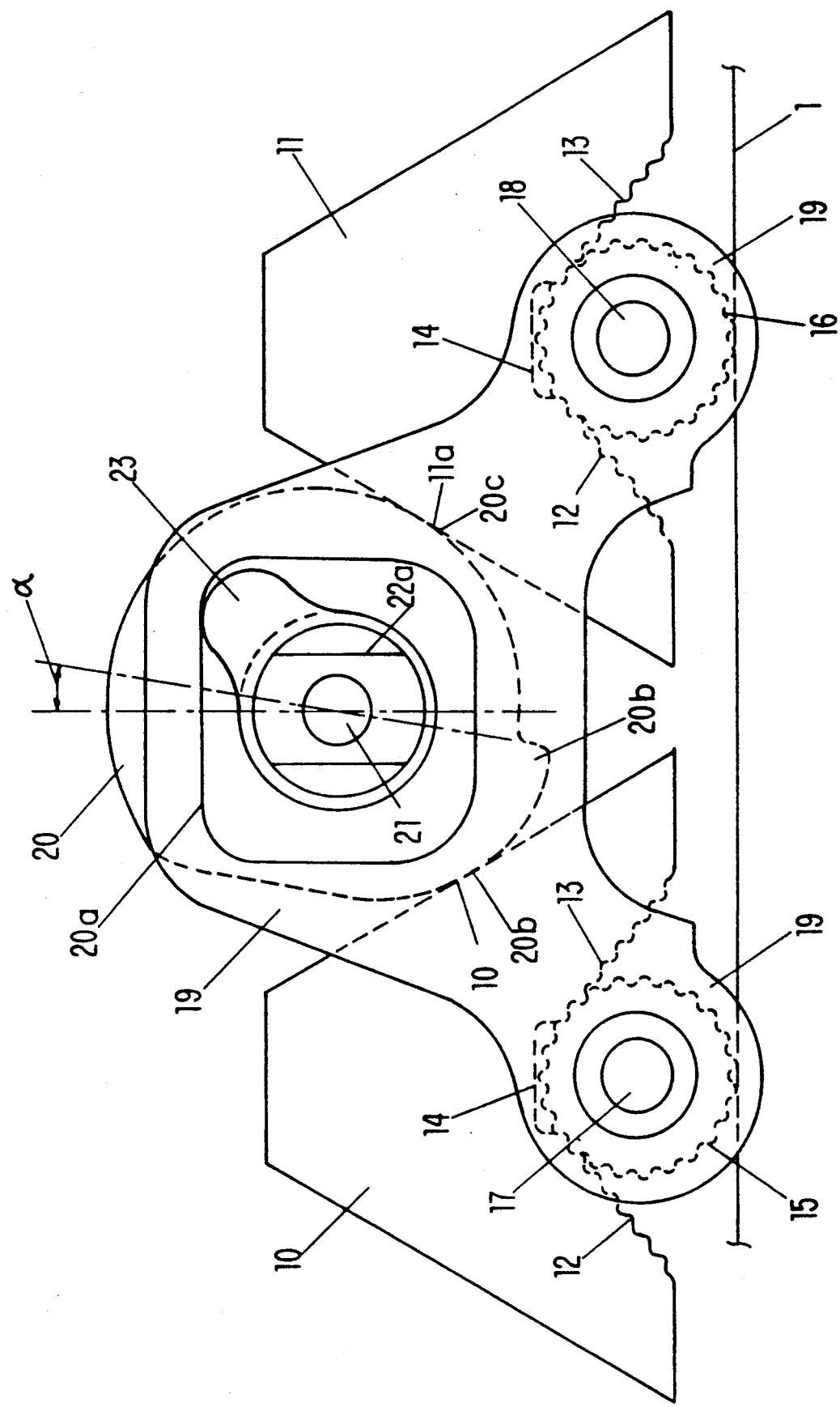
FIG. 1b is an enlarged partial view of FIG. 1, for a setting in position of the various parts of the locking device without the roller return springs.
Figure 3:
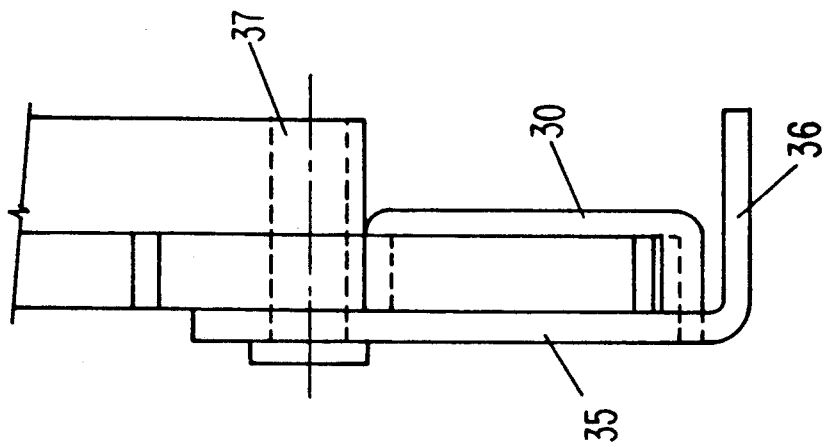
FIG. 3 is a front elevation view corresponding to FIG. 2.

As may be understood from FIG. 1a, a coil spring 123 is fixed by one of its ends 123a on the stud 22a and by its other end 123b on a stud 22b rigidly connected to the lid casing 6.

Reference numerals 20b and 20c are the points of contact of the cam 20 with the side faces 10a, 11a of the bearing plates 10, 11.

The coil spring 123 is provided to hold the rollers 15, 16 in a pressed position via the bearing plates 10, 11 and cam 20 on the rectilinear and square rod 1.

Thus, when rotating the shaft 21 anticlockwise (see angle α in FIG. 1b), it is possible to cause a slight rotation of the cam 20, the steps 20b, 20c of which will move downwardly and thereby release the pressure which the cam exerts on the bearing plates 10, 11. Thus the toothings 12, 13 of the bearing plates 10, 11 get disengaged from the toothings of the rollers 15, 16 which were firmly bearing on the upper face of the jack rod 1, while locking this rod.

The jack rod 1 is therefore free and can be displaced in opposite directions shown by the double arrow $F_1$ (FIG. 1).

In some cases and in order to provide, when the cam 20 is retracted, an easy lifting of the notched rollers 15, 16, it is possible to additionally provide two curved springs 25 having substantially a shape of an Ω and centered about circular members 9 rigidly connected to both sides of the inner casing 5 and lid casing 6.

When the jack rod 1 has been placed in a correct position, the only thing to do is to rotate the shaft 21 clockwise so that the cam 20, via its steps 20b and 20c, will lock once more the bearing plates 10, 11 which will move downwardly, thereby locking the rollers 15, 16 on the upper face of the jack rod 1.

FIG. 1c shows the position of a roller (for example the roller 16) in the slanting and toothed ramps 12, 13. From the position of the members there appears an angle α 1 avoiding a tilting of the rollers (for example the roller 16) due to: i) the supports far from the roller teeth on the toothings 12, 13 provided in the bearing plates; and ii) the double support of the two upper teeth of the rollers on the rod 1. During displacement of this rod (straight or curved), there is produced a rotation of a tooth of the rollers in the corresponding staircase-shaped ramp, a compression of the assembly formed of the rod 1, roller 16, V-shaped members 11 and cam 20, then, by reaction of the inner casing 5 and lid casing 6 with the rod and the support of the cam 20 in the casing, which eliminates the horizontal clearance of the rod or the angular clearance if the rod is substituted by a curved part (FIG. 2 and following).

The fact that the peripheral toothings of the rollers 15, 16 cooperate with the toothings 12, 13 of the bearing plates 10, 11 provides a correct hold of these members with respect to one another and a positive meshing of the rollers 15, 16 with the upper face of the jack rod 1 by holding firmly this rod even in the case of lateral or frontal impacts of the vehicle composing the seats provided with this jack. There is thus obtained a greater safety.

Figure 2:
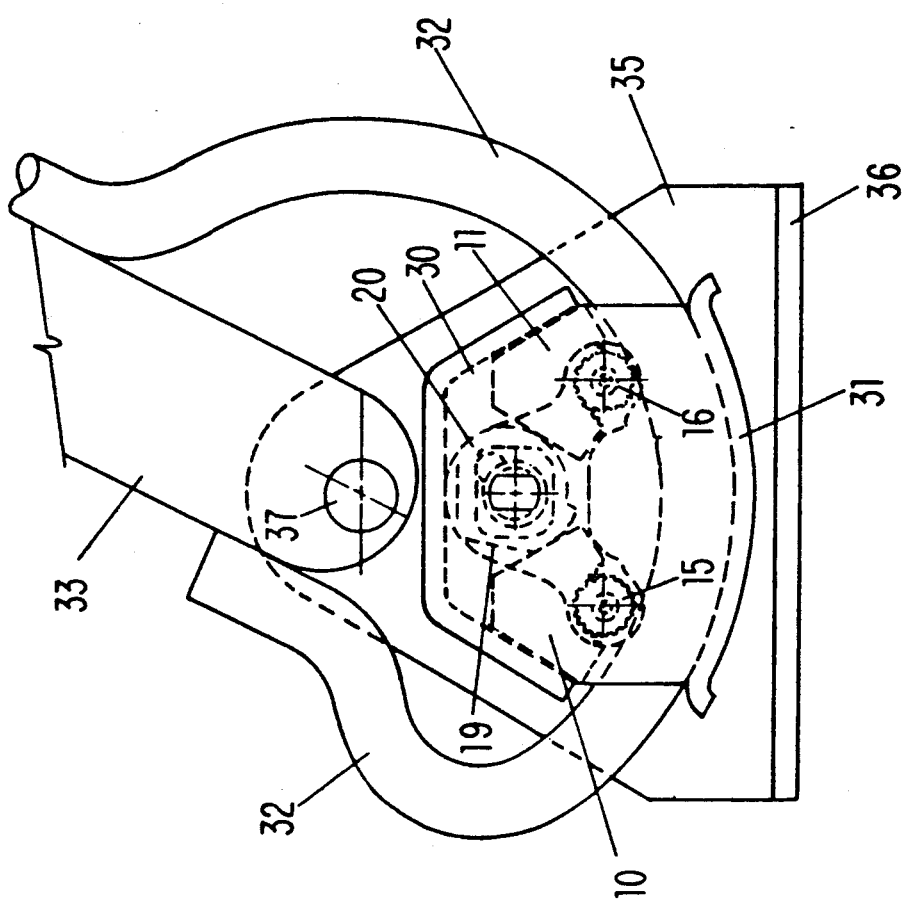
FIG. 2 is a side elevation view of the locking device for circular displacement mechanical jacks adapted to a continuous adjustment of seat back.

FIG. 2 shows that the casing 30 has a curved bottom 31 on which bears on an arc-shaped rod 32 which is welded or otherly fixed on the lower portion of the armature 33 of the seat back. The casing 30 is attached to the vertical wing 35 of a base 36 fixed on the vehicle floor or on a sliding element, for example a slide. The locking members of the arc-shaped rod 32 are identical to those described in FIG. 1 and are therefore designated by the same references. But in this case, the return spring has not been shown, as it is not necessary to use it, since return of the rollers 15, 16 is effected by the two-pointed hat-shaped member 19 under action of the snug 23 acting on the cam 20 in the recess 20a. The rotary movement being counterclockwise, the grooved rollers 15, 16 immediately disengage themselves from the upper face of the arc shaped rod 32 due to the shape as such of the latter and thereby enable an easy rotation of the armature 33 about the pin 37 solid with the vertical wing 35 of the base 36.

There again, the safety of the device has been considerably increased since, when the cam 20 is in the locking position (position shown in FIG. 2) of the bearing plates 10, 11, the toothings of the rollers 15, 16 will extend sufficiently inside the face of the arc shaped rod 32 so as to ensure a perfect locking.

In both cases of FIGS. 1 and 2, the displacement is continuous and provides therefore a perfect setting either of the jack rod 1 or of the seat back in consideration, without spacing.

Such a setting is called a "0° setting" in case of the above jack used in a seat back articulation. Actually, one can obtain a displacement as small as possible so as to provide the user with a perfect comfort. It is also possible to obtain a displacement smaller than 1 mm in the case of a slide, which slide is then usually called a "0 mm displacement" slide.

FIG. 4 shows an embodiment substantially identical to that of FIG. 2, with the base 36 supporting the vertical wing 35 holding in position the casing 40 which has been reversed over 180°.

Actually, in this case, the bearing plates 10, 11 are placed in a position which is the reverse of the position previously occupied, and therefore the rollers 15, 16 will bear, when the device is unlocked, on the bottom of the recesses formed by the opposite slopes 12, 13 of each bearing plates 10, 11. There again, a return spring for the rollers 15, 16 is not necessary since, as soon as the cam 20 is unlocked, the bearing plates 10, 11 are returned by the two-pointed hat-shaped member 19 under action of the snug 23 acting on the cam 20 of the recess 20a. In fact, the movement is obtained by the pins 17, 18 of the rollers 15, 16 mounted in the two-pointed hat-shaped member 19. Thus, the rollers 15, 16 are free, and their toothings do not mesh with the lower face of the arc-shaped member 32 which is rigidly connected to the armature 33 of the seat back. When the cam 20 pivots in the positive direction, the bearing plates 10, 11 are lifted, and they push back the rollers 15, 16 which come in contact with the shaped member 32 and lock it against the bent over edge 45 of the casing 40. An unlatching of the device is effected in the reverse direction by rotation of the cam 20 driven by a control lever (not shown) or by any other suitable motive member.

Figure 5:
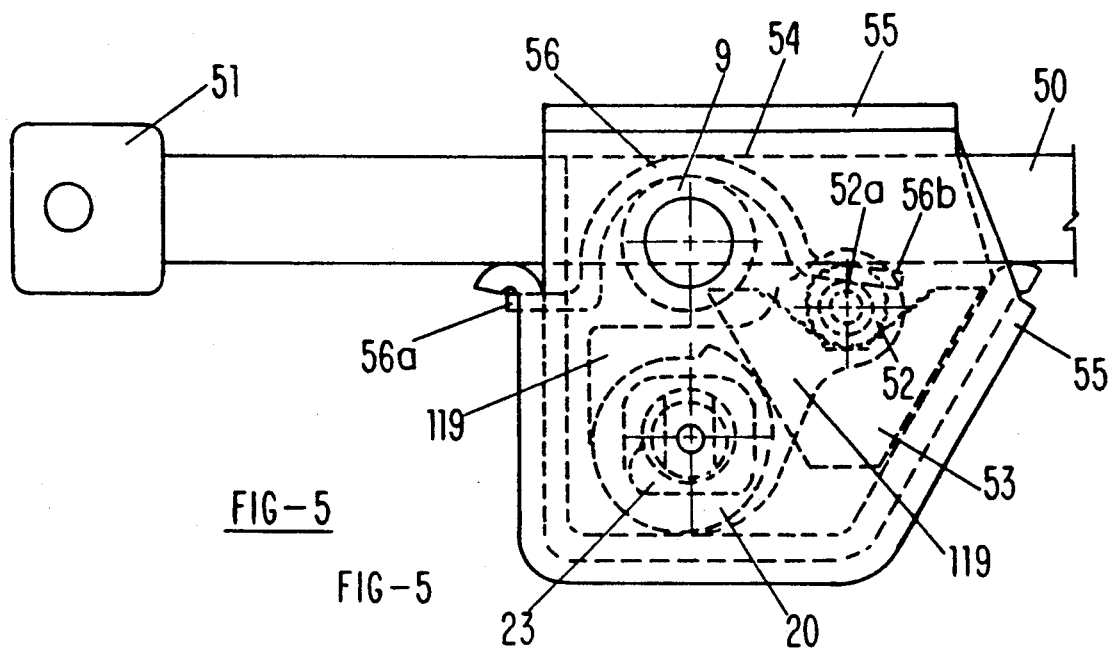
FIG. 5 is a side elevation view of a second embodiment of a rectilinear displacement mechanical jack provided with a locking device.

In FIG. 5, the latching device for rectilinear rod 50 provided with the attachment head 51 is made of a single roller 52 cooperating with a single bearing plate 53, the bearing plate and this roller being grooved. The bearing plate 53 is subjected to action of the cam 20 carrying the protrusion 23 and, in this case, due to the reversed position of the bearing plate 53, it is necessary to use a casing 54 permitting a correct hold of the rectilinear rod 50 in the lid 55 and also to use a spring 56 having substantially the shape of an Ω, which is hooked at 56a inside the casing 55 and the other end 56b of which will bear on the pin 52a of the roller 52. Centering of the springs 56 is effected about the circular members 9 as in the case of FIG. 1. Operation of this latching device is identical to that previously described. Reference numeral 119 designates the member corresponding to the two-pointed hat-shaped member 19 of the previous mechanisms.

Figure 6:
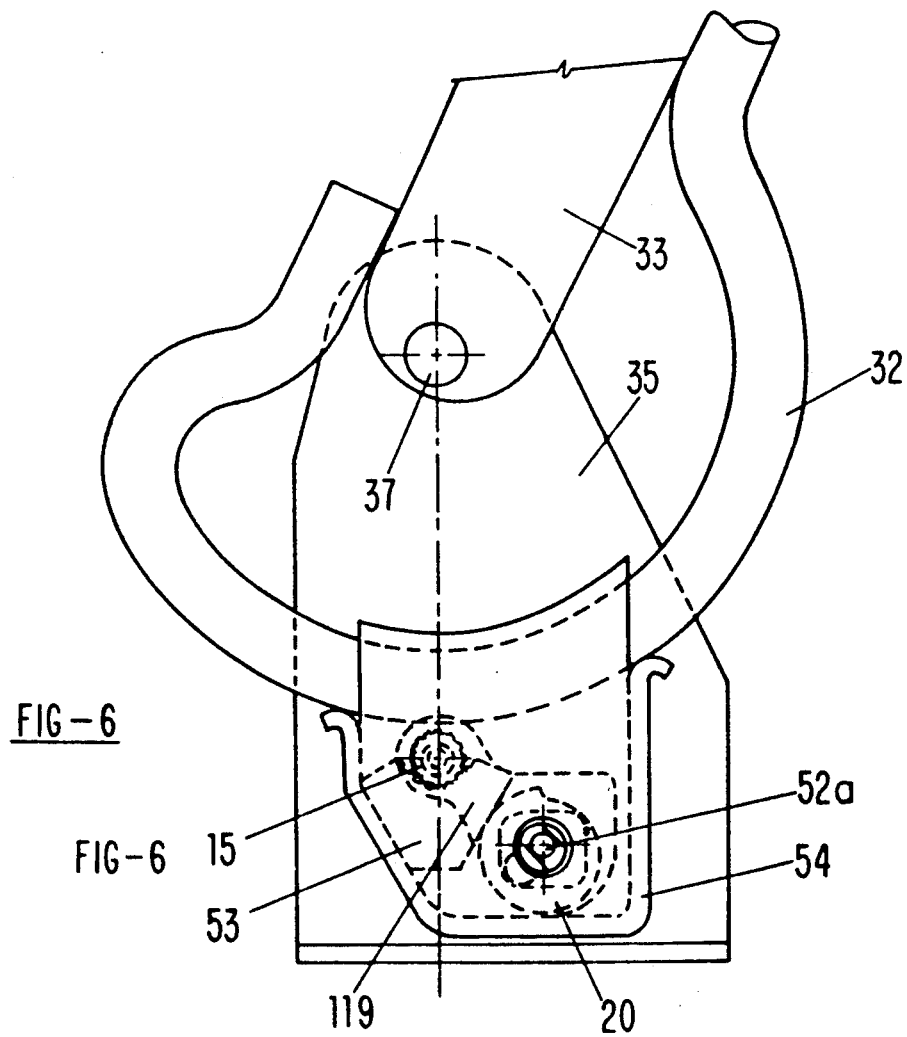
FIG. 6 is a side elevation view of a locking device for circular displacement mechanical jacks adapted to setting of a seat back.

In FIG. 6, the device of FIG. 5 is used for positioning a seat back. The arc-shaped member 32 is identical to that shown in FIG. 2. Its operation is identical, and the members are therefore designated by the same references as in FIG. 5.

Finally, in FIG. 7, the device includes a single bearing plate 60 turned downwardly, but the operation of this device is identical to that of FIG. 2 and therefore the same references as those of the preceding figures are used again.

Figure 8:
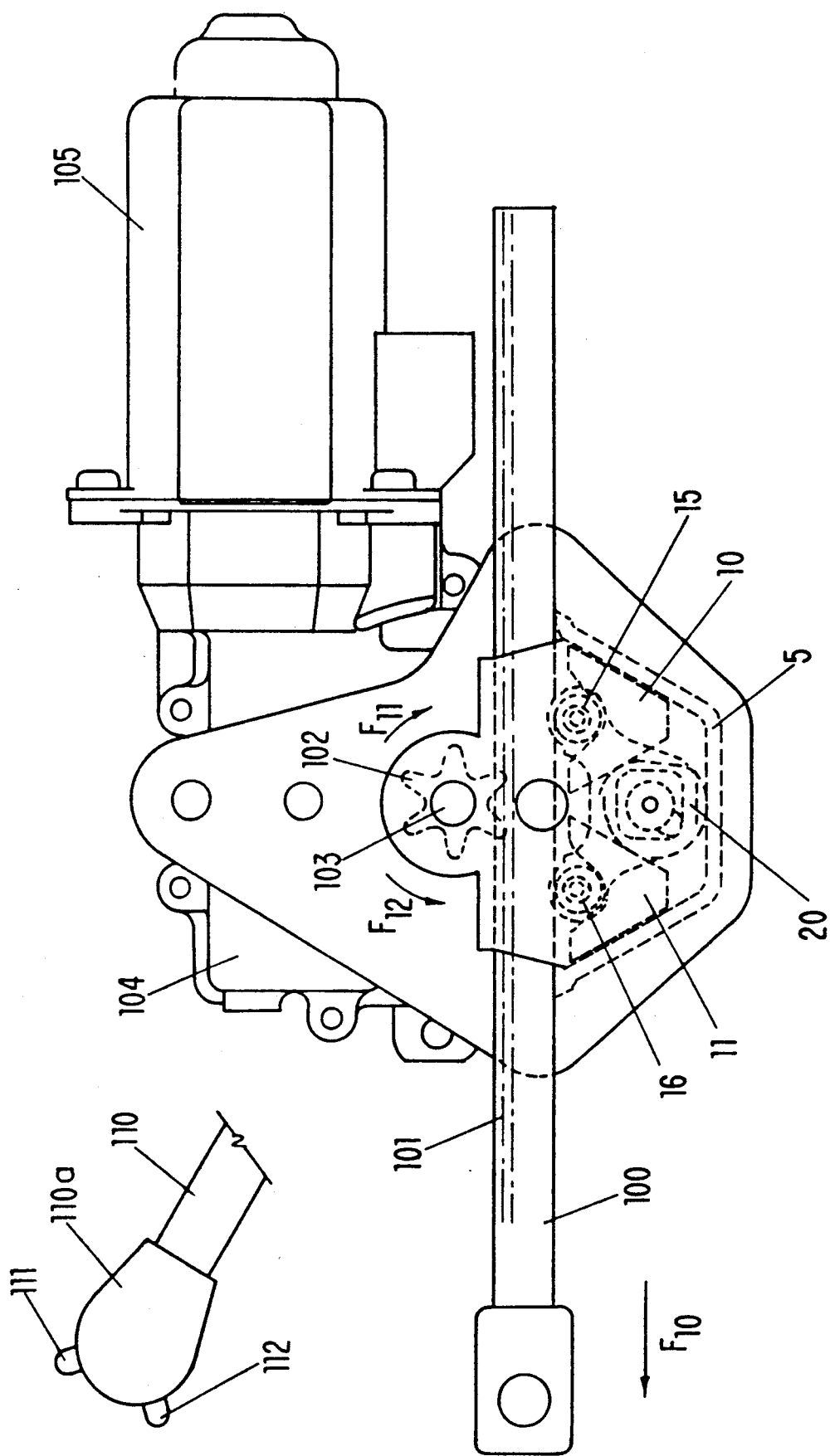
FIG. 8 is front elevation view of a mechanical jack driven by a motive member for setting of a seat or of a slide by a motor.

As may be seen in FIGS. 8 and 9, the rod 100 of the mechanical jack is, at its upper portion, provided with a rack 101 cooperating with a pinion 102 carried by a shaft 103 extending from a speed reducer 104 driven by a motor 105 which is of an electrical, pneumatic or the like type.

As regards the latching mechanism of the rod 100, there is no modification with respect to the arrangement shown and described in FIG. 1, and therefore these members are designated by the same references.

In the present case, when, with assistance of the lever 110, the rod 100 has been unlatched and when one wishes to have the rod 100 sliding frontwardly (arrow $F_{10}$, FIG. 8), one presses the control 111 carried by the control knob 110a of the lever 110, which supplies the electric motor 105 through the reversing switch by rotating the pinion in direction of the arrow $F_{11}$.

As soon as the position is reached, the control knob 111 is released, and the lever 110 is brought back to the latching position in order to lock the rod 100.

When one wishes to displace the rod 100 in the rear direction, the operation is identical as that just described, but by using the control knob 112. At that moment, the electric motor 105 drives the pinion 102 in direction of the arrow $F_{12}$.

It is also possible, in a very safe manner, to substitute the lever 110 used for the unlatching and latching of the cam 20 by an electromagnet which, by unlocking this cam, unlatches the rod 100, then according to the supplying direction of the motor 105 of the stem 100, can move either in the front direction or in the rear direction. It is possible to use any suitable positioning control member so that the unlatching function is carried out before the motor control will supply the motor 105 with electric current. A memory electronic circuit can also be used.

As soon as the electric feed of the motor 105 is no more supplied, the feed of the electromagnet controlling the cam 20 is immediately cut off, and a spring member provided to this effect on the mobile armature of the electromagnet brings back the cam 20 in the locking position.

In the hereabove case, the motorization is an electrical motorization, but could also be a pneumatic or hydraulic motorization, the safety being thus increased since it is the return spring for the cam which locks the assembly when the electric current or the pneumatic or hydraulic feed is stopped for the natural reason of use or when there is a failure of the power feed.

I claim:

1. A locking device for rectilinear or circular displacement mechanical jacks, comprising:
   at least one rod;
   notched roller means for locking said rod in a locked position thereof;
   at least one V-shaped bearing plate having toothed ramps for cooperating with said notched roller means;
   a rotatable cam for selectively bearing against said at least one bearing plate to effect said locked position of said rod, and releasing said at least one bearing plate and hence said notched roller means to free said rod;
   means to rotate said cam; and
   control means to drive said means for rotating said cam.

2. A locking device according to claim 1, in which said control means is a manual control means.

3. A locking device according to claim 1, in which said control means is a motive control means.

4. A locking device according to claim 1, in which two of said bearing plates are disposed in such a way as to effect a vertical freeing movement by being guided by an inner casing that generally has the shape of a trapezium and is provided with a lower portion as a support for said rod.

5. A locking device according to claim 1, which includes as said at least one bearing plate a single bearing plate that is vertically movable via said cam; and in which said means to rotate said cam includes stud means.

6. A locking device according to claim 1, in which said at least one bearing plate has reversed U-shaped ramps, each with a toothed face with which said notched roller means cooperate.

7. A locking device according to claim 1, in which said rod has an upper and a lower face, one of which is provided with a rack that cooperates with a pinion mounted on a shaft that is driven by a speed reducer and a motor secured to a casing that supports said rod.

8. A locking device according to claim 7, which includes means for reversing the direction of rotation of said motor, said means comprising two electrical circuits controlled by control knobs, each of which controls a reversing switch.

9. A locking device according to claim 7, which includes a memory electronic circuit control means for said motor.

10. A locking device according to claim 9, in which said control means controls freeing of said rod.

11. A locking device according to claim 10, in which said control means is an electromagnet.

* * * * *